FIG. 1.

INVENTORS
E. D. TOLIN
D. A. FLUEGEL
BY
ATTORNEYS

FIG. 2

INVENTORS
E. D. TOLIN
D. A. FLUEGEL

FIG. 4.

INVENTORS
E. D. TOLIN
D. A. FLUEGEL
BY
ATTORNEYS

INVENTORS
E. D. TOLIN
D. A. FLUEGEL
BY
ATTORNEYS

INVENTORS
E.D. TOLIN
D.A. FLUEGEL

ATTORNEYS

FIG. 10

INVENTORS
E.D. TOLIN
D. A. FLUEGEL
BY
ATTORNEYS

United States Patent Office 3,275,809
Patented Sept. 27, 1966

3,275,809
MEASUREMENT AND CONTROL OF POLYMERI-
ZATION REACTIONS
Ernest D. Tolin and Dale A. Fluegel, Bartlesville, Okla.,
assignors to Phillips Petroleum Company, a corpora-
tion of Delaware
Original application Dec. 4, 1957, Ser. No. 700,612, now
Patent No. 3,105,896, dated Oct. 1, 1963. Divided
and this application Mar. 4, 1963, Ser. No. 262,783
5 Claims. (Cl. 235—151.12)

This invention relates to apparatus for measuring and controlling the rates of polymerization reactions. In another aspect it relates to novel computing apparatus.

This application is a division of copending application, Serial No. 700,612, filed December 4, 1957, and now Patent No. 3,105,896.

Various methods are known for producing normally solid and semisolid polymers. For example, hydrocarbons, such as ethylene, propylene, isobutene, butadiene and styrene can be polymerized, either independently or in various admixtures with one another, to produce solid or semisolid polymers. Recently, considerable attention has been directed toward the production of solid olefin polymers, such as polymers of ethylene and/or propylene. The polymerizations are frequently carried out in the presence of a solid catalyst, utilizing a liquid solvent as the reaction medium. The polymerization reactions are exothermic so that it becomes necessary to provide for the removal of heat liberated by the reaction. The removal of the heat of reaction is often accomplished by employing a reactor provided with an indirect heat exchange means through which a suitable coolant is circulated. One of the problems which occurs when using such a system involves controlling the polymerization reaction rate so that a uniform product having desired properties is obtained.

In accordance with the present invention, apparatus is provided for use in measuring the rates of polymerization processes and controlling such processes in an automatic manner. The control is based upon a measurement of the heat liberated by the polymerization reaction, which measurement can be made by subtracting the heat supplied to the reactor from the heat removed from the reactor. Measurements are made of the flow rates and temperatures of all the principal streams entering and leaving the reactor. Other sources of heat addition and heat losses are also measured to provide an indication of the total amount of heat entering and leaving the reactor. Computing apparatus is provided for solving sequentially the several heat balance equations which represent the amounts of heat entering or leaving the reactor from the several process streams. This requires the solution of a plurality of multiplications. The reactor can be controlled in an automatic manner in response to the output signal from the computing mechanism. An important feature of this invention resides in providing a correction for temperature changes within the reactor. Such temperature changes are measured, and a signal representative thereof modifies the basic control signal.

Accordingly, it is an object of this invention to provide improved apparatus for use in measuring and controlling polymerization reactions.

Another object is to provide a means for compensating a heat balance control system for temperature fluctuations in the reactor.

Other objects, advantages and features of the invention should become apparent from the following detailed description which is taken in conjunction with the accompanying drawing in which.

The present invention is broadly applicable to polymerization processes in general, and more particularly to processes in which an olefin is contacted with a catalyst in suspension in a solvent. The invention is especially applicable for use in controlling the production of polymers as described in U.S. Patent No. 2,825,721. As set forth in this patent in greater detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. The amount of chromium, as chromium oxide, in the catalyst can range from 0.1 to 10 or more weight percent. Although chromium contents as high as 50 weight percent are operative, amounts above 10 weight percent appear to have little added advantage for the polymerization of ethylene. However, for the polymerization of propylene and higher boiling olefins, chromium contents as high as 25 or 30 percent are often advantageous. One satisfactory method for producing the catalyst involves the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate and ammonium chromate. The composite resulting from the impregnation step is dried and then contacted for a period of several hours at a temperature of from about 450 to 1500° F., preferably from about 900 to 1000° F., for example, with a stream of a substantially anhydrous oxygen-containing gas, such as air.

The olefin feed for the polymerization comprises at least one olefin selected from the class of 1-olefins having a maximum of 8 carbon atoms per molecule and no branching nearer the double bond than the 4-position. Examples of such olefins include ethylene, propylene, 1-butene, 1-pentene and 1,3-butadiene. Copolymers, such as ethylene-propylene copolymers and ethylene-butadiene copolymers, can be prepared by the described method. The polymerization can be effected at a temperature in the range 150 to 450° F. The pressure can range from approximately atmospheric to as high as 1000 p.s.i.

A satisfactory method of conducting the polymerization as disclosed in the above mentioned patent comprises contacting an olefin with a slurry of catalyst in a hydrocarbon solvent which can exist as a liquid at the temperature of polymerization. In such a procedure, the reaction pressure need only be sufficient to maintain the solvent substantially in the liquid phase, and ordinarily ranges from about 100 to 700 p.s.i. The control system of the present invention is particularly applicable to this type of operation, i.e., one in which an olefin is contacted with a catalyst slurry. When utilizing the control method of this invention with this type of process, it has been found to be desirable to operate at a temperature such that the polymer is substantially all in solution in the hydrocarbon solvent. This temperature will vary according to the particular solvent which is utilized, e.g., with paraffins between about 250 and 450° F., and with naphthenes between about 230 and 450° F. However, it is to be understood that the method can be used with processes carried out at temperatures such that the polymer produced is in undissolved solid form.

Suitable solvents for use in the above described process are hydrocarbons which are liquid and chemically inert under the reaction conditions. Solvents which can be employed advantageously include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be employed are naphthenic hydrocarbons having from 5 to 6 carbon atoms in a naphthenic ring and which can be maintained in the liquid phase under the polymerization conditions. Examples of such naphthenic hydrocarbons include cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above defined general class comprises those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

Figure 1:
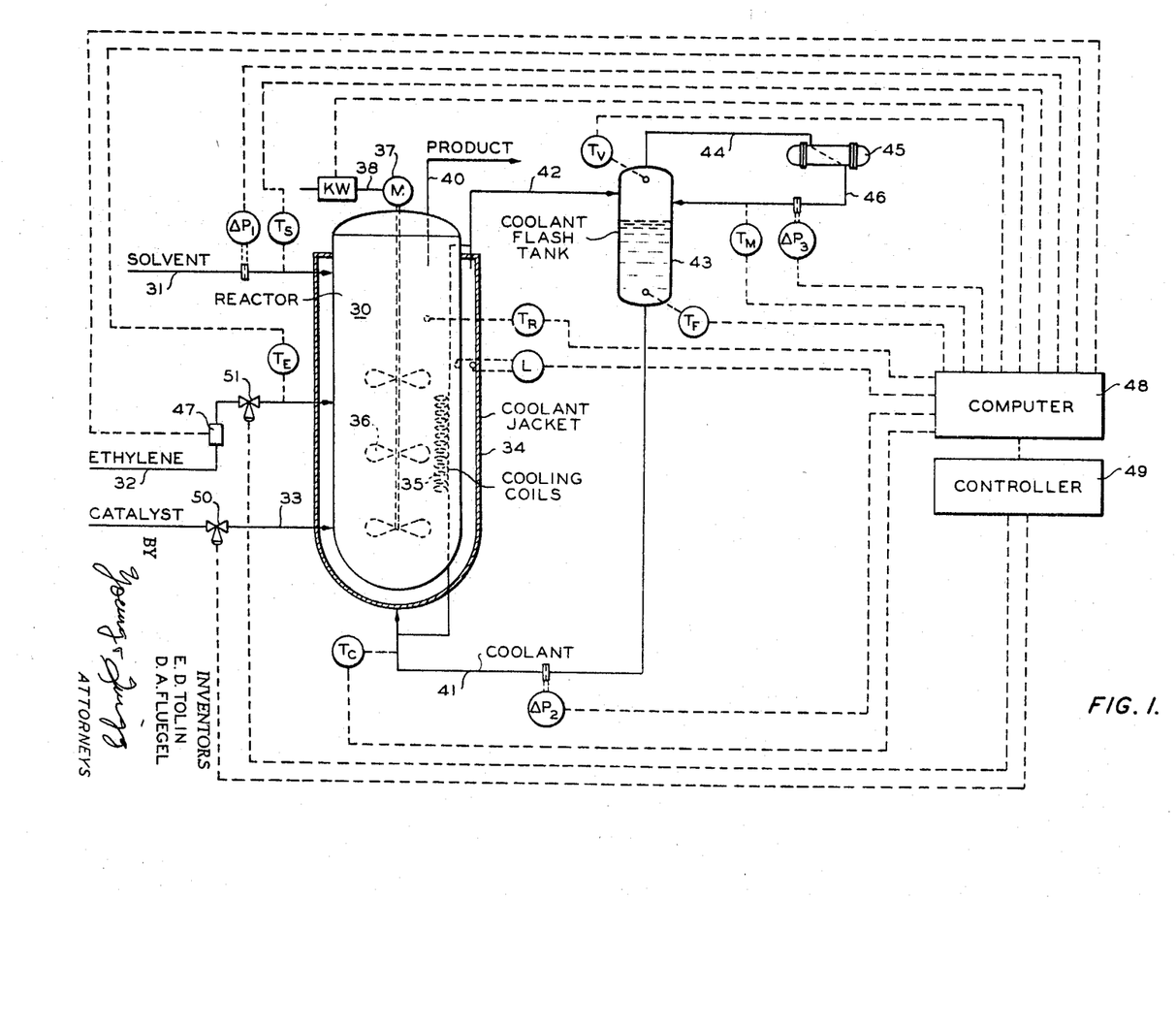
FIGURE 1 is a schematic circuit drawing of a polymerization reactor which can be controlled by the apparatus of this invention.

Referring now to FIGURE 1 of the drawing, there is shown a flow diagram which illustrates diagrammatically a preferred embodiment of the control system. While the invention is described in conjunction with a particular polymerization process, it is to be understood that it is not intended to so limit the invention. The invention is applicable to any polymerization process in which the material to be polymerized and catalyst are continuously supplied to a polymerization reaction zone.

As shown in FIGURE 1, a suitable solvent, such as cyclohexane, enters a polymerization reactor 30 through an inlet conduit 31 at a temperature of 234° F. This solvent enters the system at a rate of 237,000 pounds per day and has a composition in weight percent as follows:

| | |
|---|---|
| Methane | Trace |
| Ethylene | 0.86 |
| Ethane | 0.07 |
| Cyclohexane | 99.07 |

A feed material, such as ethylene, enters reactor 30 through an inlet conduit 32 at a temperature of 260° F. This feed enters the system at a rate of 34,113 pounds per day and has a composition as follows:

| | |
|---|---|
| Methane | 0.38 |
| Ethane | 2.80 |
| Ethylene | 95.32 |
| Cyclohexane | 1.50 |

A catalyst enters reactor 30 through an inlet conduit 33. In the particular reaction referred to by way of example, the catalyst is added to the system in the form of a slurry in the solvent, 96% cyclohexane and 4% catalyst. This catalyst is a chromium oxide-silica-alumina catalyst prepared by impregnating a 90 weight percent silica and 10 weight percent aluminum gel composite with chromium trioxide which is dried and heated in air to form a composition containing approximately 2.5 weight percent chromium in the form of chromium oxide, of which approximately one-half is in the form of hexavalent chromium. The catalyst is added at the rate of 2,725 pounds of slurry per day.

Reactor 30 is surrounded by a jacket 34 through which a coolant is circulated. A coil of heat exchange tubes 35 is disposed within the interior of reactor 30. Cooling coil 35 and jacket 34 thus provide a means for removing heat from reactor 30 during the polymerization. Reactor 30 is provided with a stirrer 36 which is driven by a motor 37. Motor 37 is energized from a source of electrical energy, not shown, which is connected to the motor by means of a cable 38. The reactor effluent is withdrawn through a product conduit 40. This effluent, comprising a mixture of polymer, solvent, spent catalyst and unreacted ethylene, is subsequently passed to suitable separation means to recover the desired polymer.

The reaction mixture in reactor 30 is maintained at a desired temperature by circulating a coolant through jacket 34 and coils 35. It is desirable to employ the same material, cyclohexane, for the coolant as is employed for the solvent. This eliminates any additional separating problems if leakage should occur between the coolant conduits and the interior of the reactor. The coolant is introduced into the system through an inlet conduit 41 which communicates with jacket 34 and coils 35. The coolant is subsequently removed from the system through a conduit 42 which communicates with a flash tank 43. Vapor is removed from flash tank 43 through a conduit 44 which communicates with the inlet of a condenser 45. The condensed vapors are returned to tank 43 through a conduit 46. The liquid in tank 43 is returned to reactor 30 through conduit 41. In order to simplify the drawing, the various pumps and valves and other controllers necessary to establish and control the flows of materials have been deleted.

From an inspection of FIGURE 1, it should be evident that heat is added to and removed from reactor 30 in several ways. The total heat liberated by the polymerization reaction is computed. This computation is made by subtracting the heat which enters the reactor from the heat which is withdrawn from the reactor. The amounts of these heats are obtained by summing a series of equations which represent the heat transferred into and out of reactor 30.

The first source of heat removal from reactor 30 results from the solvent supplied by conduit 31. This heat $Q_1$ can be calculated from the following equation:

$$Q_1 = K_1 \sqrt{[\rho T_0 + \alpha_1(T_0 - T_s)](\Delta P_1)} \\ [C_1 + \beta_1(T_{ave.} - T_1)](\Delta T_s) \quad (1)$$

where:

$K_1$ = an orifice constant
$\rho T_0$ = density at $T_0$
$\alpha_1$ = density temperature coefficient
$T_0$ = a reference temperature
$T_s$ = temperature of the solvent
$\Delta P_1$ = pressure differential across an orifice in conduit 31
$C_1$ = specific heat of the solvent at $T_1$
$\beta_1$ = specific heat temperature coefficient
$T_{ave.}$ = average temperature, defined hereinafter
$T_1$ = a reference temperature
$\Delta T_s$ = temperature difference, defined hereinafter, see FIGURE 2

The heat $Q_2$ removed from the reactor by the coolant is represented as follows:

$$Q_2 = K_2\sqrt{\Delta P_2}(C_3)\Delta T_c \quad (2)$$

where:
- $K_2$ = an orifice constant
- $\Delta P_2$ = pressure differential across an orifice in conduit 41
- $\Delta T_c$ = temperature difference, defined hereinafter, see FIGURE 2
- $C_3$ = specific heat of the coolant The sensible heat $Q_3$ removed by cooling of the condensed vapors from flash tank 43 is represented as follows:

$$Q_3 = K_3\sqrt{[\rho_1 + \alpha_2(T_0 - T_M)]\Delta P_3}(C_3)\Delta T_M \quad (3)$$

where:
- $K_3$ = an orifice constant
- $T_M$ = temperature of coolant in conduit 46
- $\alpha_2$ = density temperature coefficient
- $\Delta P_3$ = pressure differential across an orifice in conduit 46
- $\Delta T_M$ = temperature difference, defined hereinafter, see FIGURE 2.

Heat is also removed from reactor 30 due to conduction through the insulated walls of the reactor. This heat loss $Q_4$ can be represented as follows:

$$Q_4 = K_4 V \quad (4)$$

where:
- $K_4$ = a constant
- $V$ = temperature difference across reactor walls.

The major amount of heat removal results from the heat of vaporization of the coolant. This is represented as follows:

$$Q_5 = K_3\sqrt{[\rho_1 + \alpha_2(T_0 - T_M)]\Delta P_3}[C_5 + \beta_2(T_V - T_1)] \quad (5)$$

where:
- $K_3$ = an orifice constant
- $\Delta P_3$ = pressure differential across an orifice in conduit 46
- $C_5$ = heat of vaporization of the coolant at $T_1$
- $\beta_2$ = heat of vaporization temperature coefficient
- $T_V$ = temperature of vapor in tank 43.

The heat $Q_6$ removed from the reactor by the olefin stream is represented as follows:

$$Q_6 = \text{Flow }(C_7)\Delta T_E \quad (6)$$

where:
- Flow = flow of the olefin
- $C_7$ = specific heat of the olefin
- $\Delta T_E$ = temperature difference, defined hereinafter, see FIGURE 2.

Heat is generated within the reactor by rotation of stirrer 36. This heat $Q_8$ is represented as follows:

$$Q_8 = (KW_{\text{Load}} - KW_{\text{No Load}}) \times 3{,}413 \quad (7)$$

where:
- $KW_{\text{Load}}$ = energy supplied to motor 37 without a load on the stirrer
- $KW_{\text{No Load}}$ = energy supplied to motor 37 with a load on the stirrer
- 3,413 = B.t.u. per kw. hour.

The heat $Q_7$ removed by the catalyst slurry is assumed to be constant. Heat is also supplied to reactor 30 due to the heat of solution of the olefin in the solvent. This is represented as follows:

$$Q_9 = \text{Flow} \times K_6 \quad (8)$$

where: $K_6$ = constant relating to heat of solution.

The various quantities indicated in the foregoing equations are measured by the apparatus illustrated schematically in FIGURE 1. The temperatures of the materials flowing through conduits 31, 32, 41 and 46 are measured by temperature sensing elements $T_S$, $T_E$, $T_C$ and $T_M$, respectively. The temperature within reactor 30 is measured by a temperature sensing element $T_R$. The temperatures of the liquid and vapor in tank 43 are measured by respective temperature sensing elements $T_F$ and $T_V$. The heat loss through the reactor walls is measured by a sensing element L. The heat generated by stirrer 36 is measured in terms of the power supplied to motor 37. This power is measured by a wattmeter KW which can be a thermal converter of the type described in Bulletin 77-39-0-2 of Leeds & Northrup Company, Philadelphia, Pa., for example. The flow rates through conduits 31, 41 and 46 are measured in terms of pressure differences across orifices in the respective conduits. These pressure measurements are made by respective detecting elements $\Delta P_1$, $\Delta P_2$, and $\Delta P_3$. The outputs of the several detecting elements of FIGURE 1 are applied to a computer 48. The output signal of computer 48 energizes a controller 49 which regulates either a valve 50 in conduit 33 or a valve 51 in conduit 32. The rate of addition of catalyst or olefin to reactor 30 can thus be regulated to maintain the reaction at a uniform rate, as evidenced by a constant heat output, so as to provide a product having uniform properties.

The various temperatures which are measured by the apparatus of FIGURE 1 can be conveniently obtained by means of thermocouples. These various thermocouples are illustrated schematically in FIGURE 2. Certain of these thermocouples are provided with cold junctions which are indicated by primed reference characters. Two separate thermocouples are employed to measure the temperature within reactor 30. These thermocouples are designated as $T_R$ and $T_{R1}$. The terminals of these various thermocouples are connected in the manner illustrated in FIGURE 2 to provide the various quantities indicated adjacent the respective terminals which are designated 5a and 5b, 2a and 2b, 3a and 3b, 13a and 13b, 12a and 12b, 9a and 9b, 8a and 8b, and 6a and 6b. The three differential pressure measurements are applied in sequence to a flow transducer 55 which provides an output representative of flow. The output of transducer 55 is connected between terminals 4a and 4b, 7a and 7b, and 10a and 10b. The heat loss through the reactor walls is measured by a series of spaced differential thermocouples L having first junctions near the inner walls and second junctions near the outer walls. The outputs of these differential thermocouples thus provide signals which are representative of the heat transferred through the reactor walls. This signal is applied between terminals 11a and 11b. The output signal of wattmeter KW is applied between terminals 14a and 14b. The output signal of flowmeter 47, which provides a signal directly related to ethylene flow, is applied through a transducer 56 to terminals 15a and 15b. As will become apparent from the detailed description which follows, the several output signals from the apparatus of FIGURE 2 are all direct current voltages. These voltages constitute the inputs to the computer.

In the described example, $T_E$, $T_S$, $T_V$, $T_F$, $T_M$, $T_R$ and $T_C$ are approximately 260° F., 234° F., 230° F., 228° F., 100° F., 280° F. and 229° F., respectively, $KW_{\text{Load}}$ is 35 kw. and $KW_{\text{No Load}}$ is 5 kw. Reactor 30 has a volume of 3300 gallons.

Figure 3:
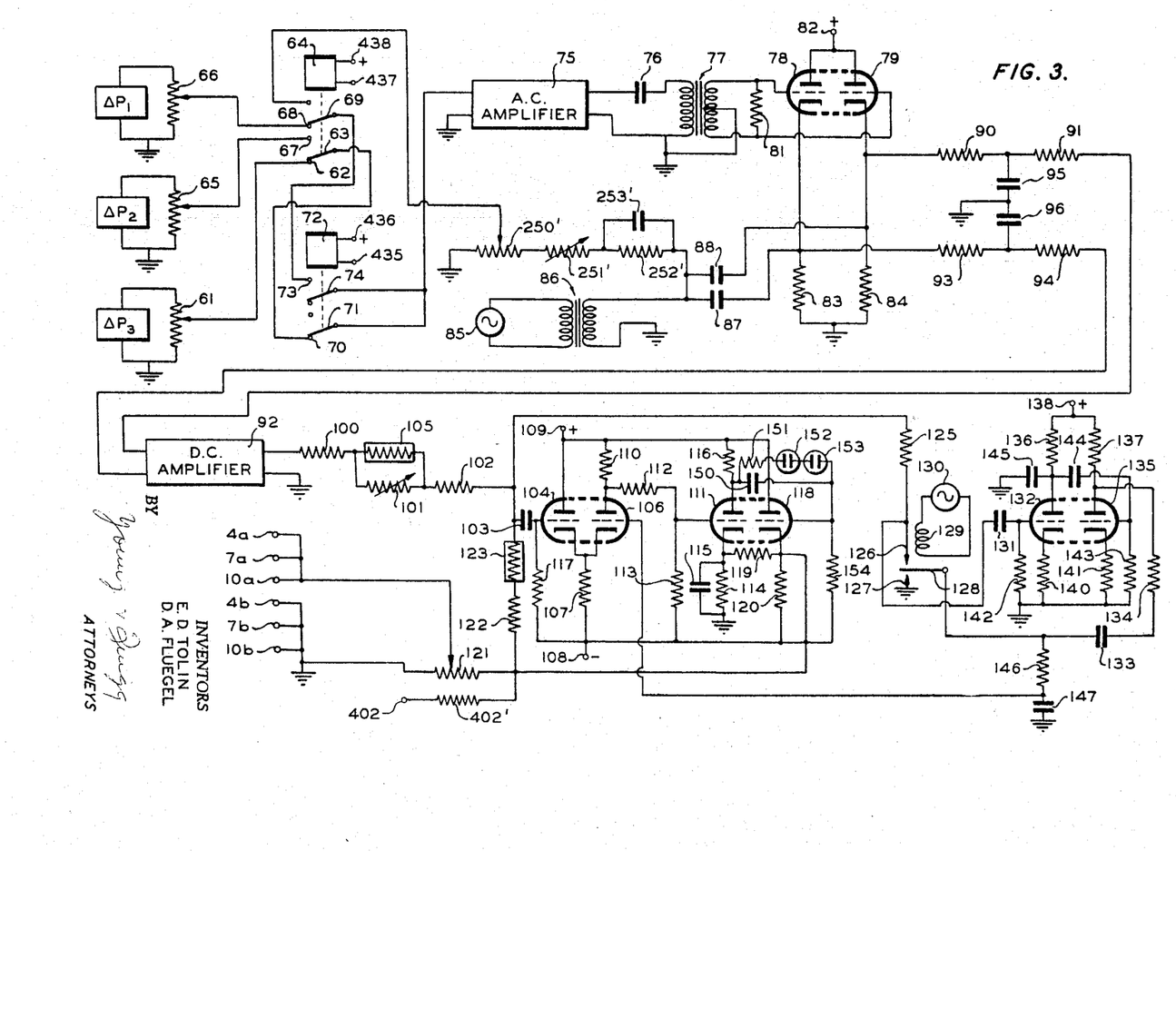
FIGURE 3 is a schematic circuit drawing of a portion of the computer which establishes signals representative of flows of the inlet streams into the reactor.

The detecting elements $\Delta P_1$, $\Delta P_2$ and $\Delta P_3$ provide output alternating current signals which are representative of the pressure differences across the respective orifices. Suitable elements for this purpose are described in Bulletin A-707, The Swartwout Company, Cleveland Ohio. These signals are converted by flow transducer 55 into direct voltages which are proportional to the respective flows. With reference to FIGURE 3, the first output terminal of flow detecting element $\Delta P_3$ is connected to the first end terminal of potentiometer 61. The second output terminal of detecting element $\Delta P_3$ is connected to the sceond end terminal of potentiometer 61 and to ground. The contactor of potentiometer 61 is connected to a terminal 62 which is adapted to be engaged by a switch 63. Switch 63 is actuated by a relay 64. Flow indicating elements $\Delta P_2$ and $\Delta P_1$ are likewise connected across respective potentiometers 65 and 66. The contactor of potentiometer 65 is connected to a terminal 67 which is engaged by switch 63 when relay 64 is energized. The contactor of potentiometer 66 is connected to a terminal 68 which is engaged by a switch 69 when relay 64 is not energized. Switch 63 is connected to a terminal 70 which is engaged by a switch 71 when a relay 72 is not energized. Switch 69 is connected to a terminal 73 which is engaged by a switch 74 when relay 72 is energized. Switches 71 and 74 are connected to the first input terminal of an alternating current amplifier 75, the second input terminal of which is connected to ground. Potentiometer 65 actually is not required in the specific example described, and can effectively be eliminated by moving its contactor to the uppermost position.

Relays 64 and 72 are energized selectively by a circuit described in detail hereinafter. When both relays 64 and 72 are deenergized, potentiometer 61 is connected to its amplifier 75. When relay 64 alone is energized, potentiometer 65 is connected to amplifier 75. When relay 72 alone is energized, potentiometer 66 is connected to amplifier 75. A reference voltage is connected to amplifier 75 when 64 and 72 are energized. The potentiometers 61 and 66 are employed to multiply the pressure difference signals by density correction factors.

The first output terminal of amplifier 75 is connected through a capacitor 76 to the first end terminal of the primary winding of a transformer 77. The second output terminal of amplifier 75 is connected to ground and to the second end terminal of the primary winding of transformer 77. The end terminals of the secondary windings of transformer 77 are connected to the control grids of triodes 78 and 79, respectively. The center-tap of the secondary winding of transformer 77 is connected to ground. A resistor 81 is connected in parallel with the secondary winding of transformer 77. The anodes of triodes 78 and 79 are connected to a terminal 82 which is maintained at a positive potential. The cathodes of triodes 78 and 79 are connected to ground through respective resistors 83 and 84. A source of alternating current 85 of the same frequency as the output signals from elements $\Delta P_1$, $\Delta P_2$ and $\Delta P_3$ is applied across the primary winding of a transformer 86. The first end terminal of the secondary winding of transformer 86 is connected through capacitors 87 and 88 to the cathodes of triodes 78 and 79, respectively. The second end terminal of the secondary winding of transformer 86 is connected to ground. The cathode of triode 79 is connected through series connected resistors 90 and 91 to the first input terminal of a direct current amplifier 92. The cathode of triode 78 is connected through series connected resistors 93 and 94 to the second input terminal of amplifier 92. A capacitor 95 is connected between ground and the junction between resistors 90 and 91 and a capacitor 96 is connected between ground and the junction between resistors 93 and 94.

Triodes 78 and 79 and the circuit elements associated therewith thus form a phase sensitive detector which provides an output direct voltage of magnitude proportional to the alternating input voltage. The output signals from the cathodes of the two tubes are filtered so that a smooth direct voltage is supplied to the input of amplifier 92. The remainder of the circuit illustrated in FIGURE 3 with the exception of elements 250' to 253' is provided to obtain a signal proportional to the square root of the output signal from amplifier 92.

The first output terminal of amplifier 92 is connected through a resistor 100, a variable resistor 101, a resistor 102 and a capacitor 103 to the control grid of a triode 104. The control grid of triode 104 is connected to a negative potential terminal 108 through a resistor 117.

Resistor 101 is shunted by a nonlinear resistance element 105. The cathode of triode 104 is connected to the cathode of a triode 106. These two cathodes are connected through a resistor 107 to a terminal 108 which is maintained at a negative potential. The anode of triode 104 is connected to a terminal 109 which is maintained at a positive potential. The anode of triode 106 is connected to terminal 109 through a resistor 110 and to the control grid of a triode 111 through a resistor 112. The control grid of triode 111 is connected to terminal 108 through a resistor 113. The cathode of triode 111 is connected to the ground through a resistor 114 which is shunted by a capacitor 115. The anode of triode 111 is connected to terminal 109 through a resistor 116. The cathode of triode 111 is also connected to the cathode of a triode 118 through a resistor 119. The anode of triode 118 is connected to terminal 109, and the cathode of triode 118 is connected through a resistor 120 to terminal 108. The cathode of triode 118 is connected to ground through a potentiometer 121. The contactor of potentiometer 121 is connected to output terminals 4a, 7a, and 10a. The cathode of triode 118 is also connected to the junction between resistor 102 and capacitor 103 through a resistor 122 and a second nonlinear resistance element 123.

Triodes 104, 106 and 111 and the circuit elements associated therewith thus provide an operational amplifier wherein the output signal is a function of the square root of the input signal. This is accomplished by means of the nonlinear resistance elements in the input circuit and in the feedback circuit. These elements are selected so that the current flows therethrough are an inverse exponential function of the voltages applied across the elements.

A stabilizing amplifier is provided in the circuit of FIGURE 3 to avoid drift in the direct current operational amplifier. The junction between resistor 102 and capacitor 103 is connected through a resistor 125 to the first contact 126 of a vibrator assembly. The second contact 127 is connected to ground. A switch 128 vibrates between contacts 126 and 127 when a coil 129 is energized by a source of alternating current 130. Contact 126 is connected through a capacitor 131 to the control grid of a triode 132. Switch 128 is connected through a capacitor 133 and a resistor 134 to the anode of a triode 135. The anodes of triodes 132 and 135 are connected through respective resistors 136 and 137 to a terminal 138 which is maintained at a positive potential. The cathodes of triodes 132 and 135 are connected to ground through respective resistors 140 and 141. The control grids of triodes 132 and 135 are connected to ground through respective resistors 142 and 143. The anode of triode 132 is connected through a capacitor 144 to the control grid of triode 135. A capacitor 145 is connected between the anode of triode 132 and ground. Switch 128 is also connected through a resistor 146 to the control grid of triode 106. The control grid of triode 106 is connected to ground through a capacitor 147. The anode of triode 111 is connected to the control grid of triode 118 through a capacitor 150 which is shunted by a resistor 151 and electrical discharge tubes 152 and 153 which are connected in series relationship. The control grid of triode 118 is connected to terminal 108 through a resistor 154.

The alternating current amplifier thus formed by triodes 132 and 135 forms a feedback network in the direct current amplifier in order to stabilize the direct current amplifier against drift.

Figure 2:
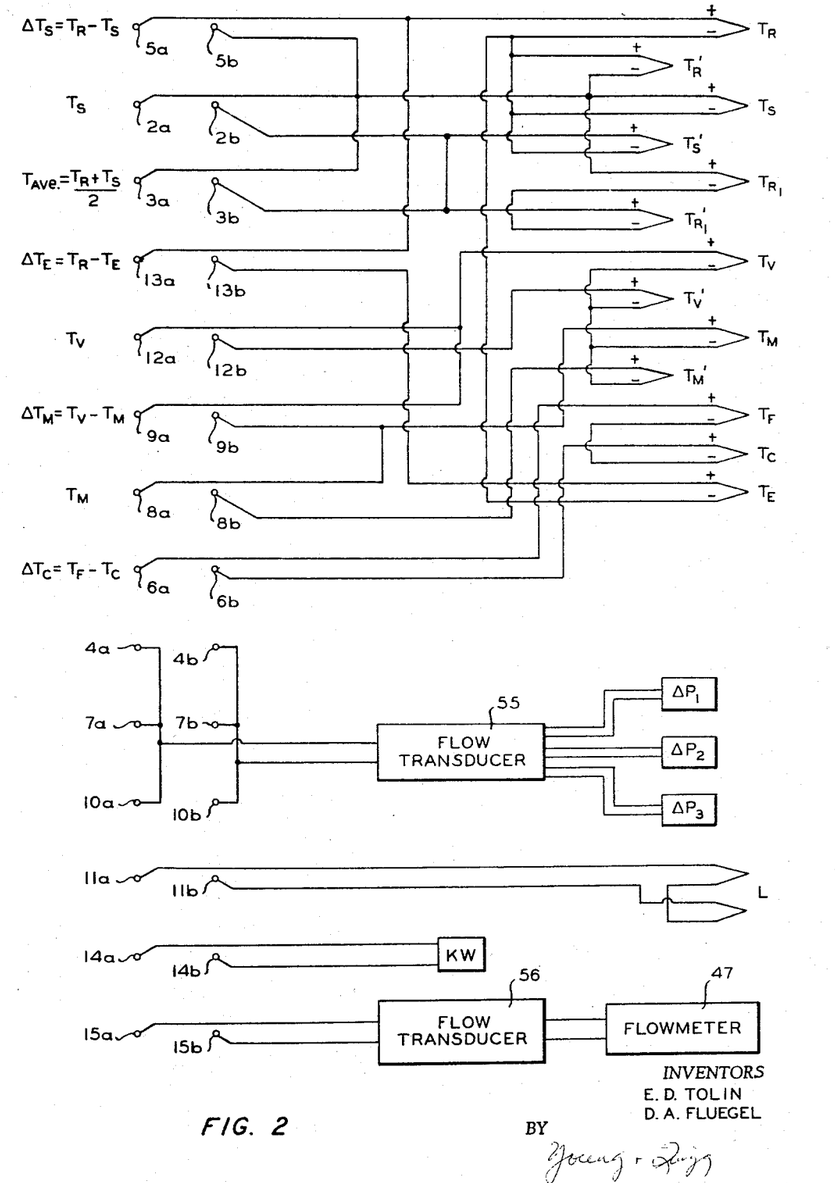
FIGURE 2 is a schematic circuit drawing showing the detecting elements of FIGURE 1.
Figure 4:
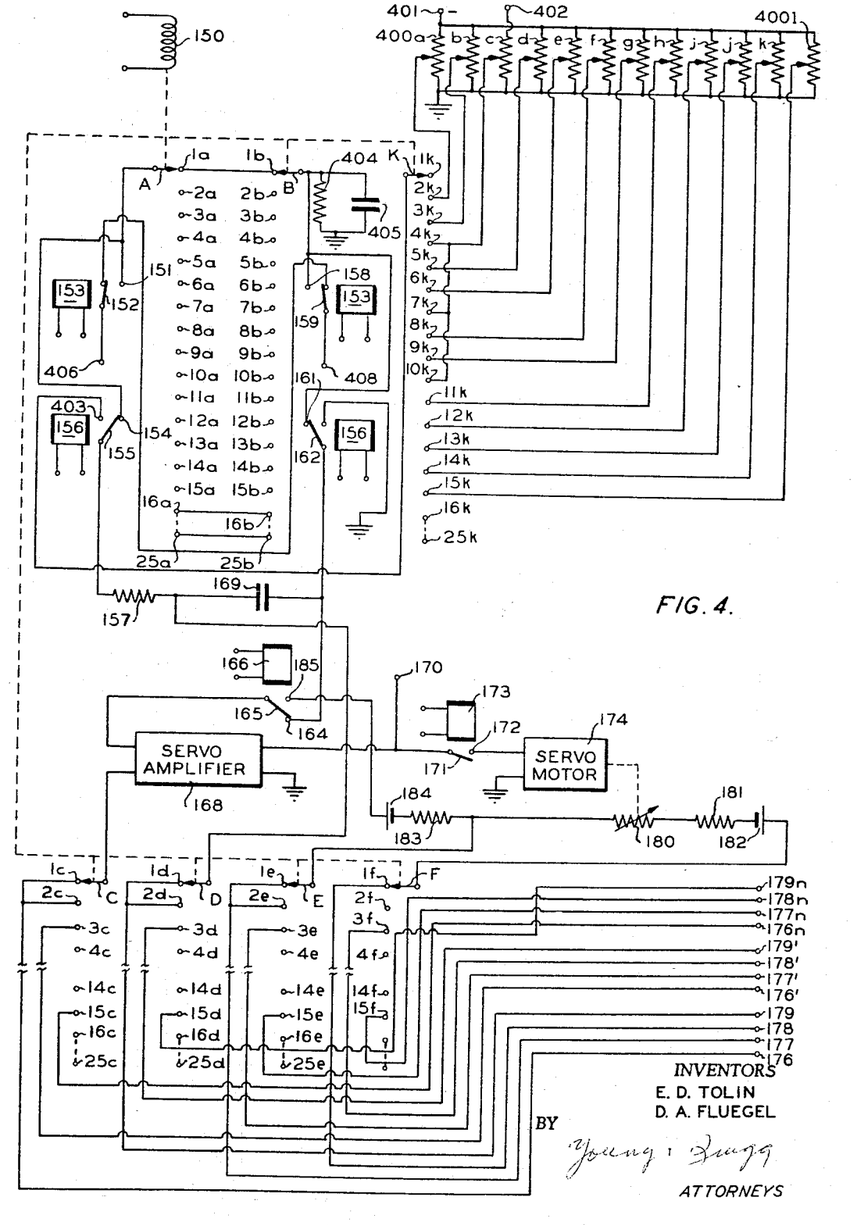
FIGURE 4 is a schematic circuit drawing of the input terminals of the computer and a portion of the automatic balancing mechanism.

The direct voltages which appear between the several pairs of terminals of FIGURE 2 are converted into corresponding potentiometer settings in order to perform the multiplications required to solve the heat transfer equations. These voltages are converted into the respective potentiometer settings in sequence and repetitively by means of a stepping switch. The circuit employed to establish the potentiometer settings is illustrated schematically in FIGURES 4 and 5. The output terminals of FIGURE 2 are represented in FIGURE 4 as the *a* and *b* terminals of the stepping switch. The *a* terminals are engaged in sequence by switch arm A and the *b* terminals are engaged in sequence by switch arm B. The switch arms move between adjacent terminals each time a solenoid 150 is energized. The stepping switch preferably is of the rotary type so that the switch arms move successively to adjacent contacts and then repeat the operation. The stepping switch employed in one particular embodiment of this invention had 25 contacts associated with each switch arm. The computing operation of the described example can be accomplished with less contacts, although some of the additional contacts are employed in the calibration steps described hereinafter.

Switch arm A is connected to a terminal 151 which is engaged by a switch 152 when a relay 153 is deenergized. Switch arm A is also connected to a terminal 154 which is engaged by a switch 155 when a relay 156 is deenergized. Switch 155 is connected through a resistor 157 to switch arm D of the stepping switch. Switch arm B is connected to a terminal 158 which is engaged by switch 159 when relay 153 is deenergized. A resistor 404 and a capacitor 405 are connected in parallel between switch arm B and ground. Switch arm B is also connected to a terminal 161 which is engaged by a switch 162 when relay 156 is deenergized. Switch 162 is connected to a terminal 164 which is engaged by switch 165 when a relay 166 is deenergized. Switch 165 is connected to the first input terminal of servo amplifier 168. The second input terminal of amplifier 168 is connected to switch arm C of the stepping switch. A capacitor 169 is connected between terminal 164 and switch arm D. The first output terminal of amplifier 168 is connected to a terminal 170 and to a switch 171 which engages a terminal 172 when a relay 173 is energized. Terminal 172 is connected to the first input terminal of a servo motor 174. The second output terminal of amplifier 168 and the second input terminal of motor 174 are grounded.

Terminals 1c and 2c of the stepping switch are connected to a terminal 176; terminals 1e and 2e are connected to a terminal 177; terminals 1f and 2f are connected to a terminal 178; and terminals 1d and 2d are connected to a terminal 179. A variable resistor 180, a resistor 181, and a battery 182 are connected in series relationship between switch arms E and F. A resistor 183 and a standard cell 184 are connected in series relationship between switch arm E and a terminal 185 which is engaged by switch 165 when relay 166 is energized. Terminals 176, 177, 178 and 179 are connected to the circuit illustrated in FIGURE 5. Terminal 176 is connected to the junction between resistors 180′ and 181′. The second terminal of resistor 180′ is connected to terminal 178, and the second terminal of resistor 181′ is connected to terminal 177. A resistor 183′, a potentiometer 184′, and a resistor 185′ are connected in series relationship between terminals 178 and 177. Resistors 186 and 187 are connected in parallel with the potentiometer 184′. Terminal 179 is connected by means of a conductor 188 which forms a temperature compensating thermocouple cold junction, to the contactor of potentiometer 184′.

Figure 5:
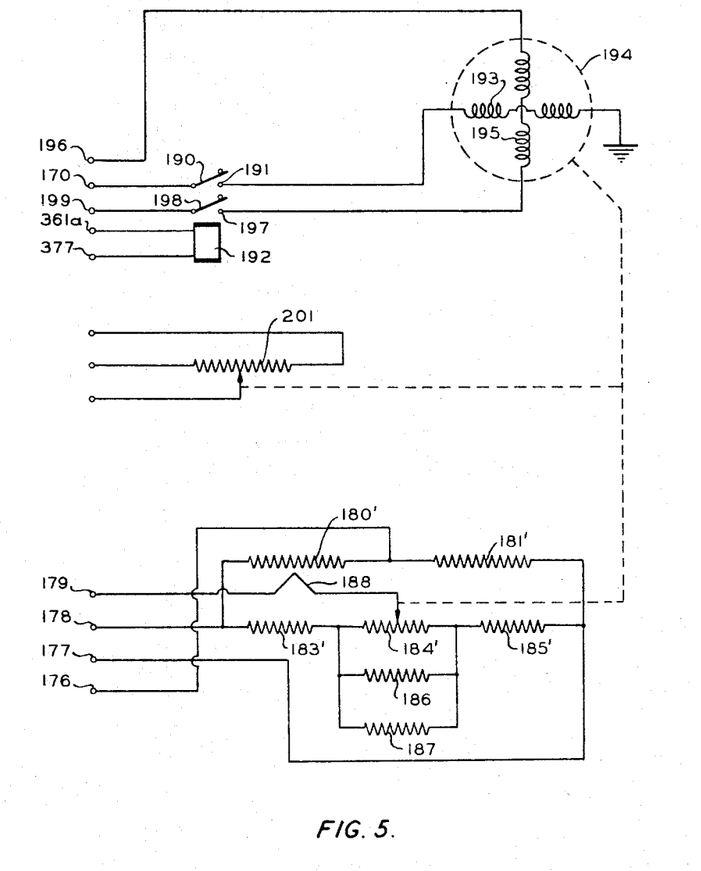
FIGURE 5 is a schematic circuit drawing showing a second portion of the automatic balancing mechanism.

Terminal 170 of FIGURE 5 is connected to a switch 190 which engages a terminal 191 when a relay 192 is energized. Terminal 191 is connected through the first coil 193 of a reversible two-phase induction motor 194 to ground. One terminal of the second coil 195 of motor 194 is connected to a terminal 196. The second terminal of coil 195 is connected to a terminal 197 which is engaged by a switch 198 when relay 192 is energized. Switch 198 is connected to a terminal 199. An alternating current source described hereinafter is connected between terminals 196 and 199. The drive shaft of motor 194 is connected to the contactor of potentiometer 184′.

The drive shaft of motor 194 is also connected to the contactors of potentiometers 201 and 202.

The circuit of FIGURES 4 and 5 forms a self-balancing potentiometer. The input signal appears between the first input terminal of amplifier 168 and switch arm D. This signal is balanced against a reference voltage in the bridge network so that any potential difference energizes motor 194 through amplifier 168. This portion of the circuit of FIGURES 4 and 5 comprises a conventional balancing circuit of the general type described in Bulletin No. B15-13, Minneapolis-Honeywell Regulator Co., Brown Instrument Division, Philadelphia, Pa. If the input signal differs from the reference voltage, motor 194 is energized to adjust the position of the contactor of potentiometer 184′. This adjustment continues until the circuit is restored to a set of balance. The rotation of motor 194 required to establish this balance is, therefore, a function of the magnitude of the input signal. This rotation also establishes the positions of the contactor of potentiometer 201.

The computer of this invention is also provided with thirteen additional networks, not shown, of the general form of FIGURE 5. The first of these additional networks is connected into the circuit of FIGURE 4 by means of terminals 176′, 177′, 178′ and 179′. The last of these additional networks is connected into the circuit of FIGURE 4 by means of terminals 176n, 177n, 178n, and 179n. The potentiometers of these fourteen networks are adjusted sequentially as the arms of the stepping switch move to adjacent contacts. This entire stepping operation is repeated continuously to reset the potentiometers representative of changes in the variables to be measured.

Figure 7:
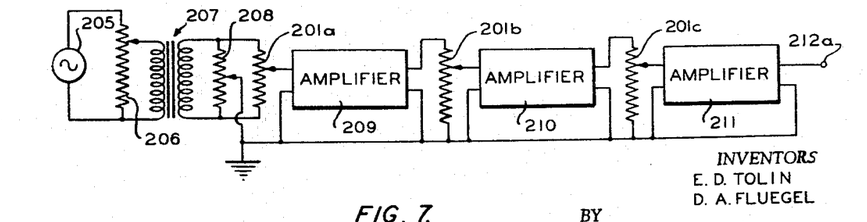
FIGURE 7 is a schematic circuit drawing of one of the multiplication channels of the computer.

One of the networks employed to perform the multiplication required to solve the heat transfer equations indicated above is illustrated in FIGURE 7. A source of alternating current 205 is connected across a potentiometer 206. This primary winding of a transformer 207 is connected between the contactor and one end terminal of potentiometer 206. The secondary winding of transformer 207 is connected across a potentiometer 201a. A potentiometer 208, having a grounded center tap, is connected across the secondary winding of transformer 207. The contactor of potentiometer 201a is connected to the first input terminal of an isolation amplifier 209. The first output terminal of amplifier 209 is connected to the first end terminal of a potentiometer 201b. The second end terminal of potentiometer 201b is connected to ground. The contactor of potentiometer 201b is connected to the first input terminal of an isolation amplifier 210. The first ouptut terminal of amplifier 210 is connected to the first end terminal of potentiometer 201c. The second end terminal of potentiometer 201c is connected to ground. The contactor of potentiometer 201c is connected to the first input terminal of an amplifier 211.

The first output terminal of amplifier 210 is connected an output terminal 212a. The second output and input terminals of amplifiers 209, 210 and 211 are connected to ground.

With reference to Equation 1, it can be seen that there are three principal quantities to be multiplied to obtain the product. These three variables are represented by the three potentiometers 201a, 201b and 201c of FIGURE 7, each of which corresponds to one of the potentiometers 201 of FIGURE 5. The indicated multiplication is provided by these three cascade connected potentiometers. The isolation amplifiers are employed to prevent current from being drawn from the potentiometers. Circuits similar to the circuit of FIGURE 7 are provided for each of the other heat transfer equations to be solved. The equations which have fewer than three variables to be multiplied require fewer potentiometers. These circuits are otherwise similar to the circuits of FIGURE 7.

Figure 8:
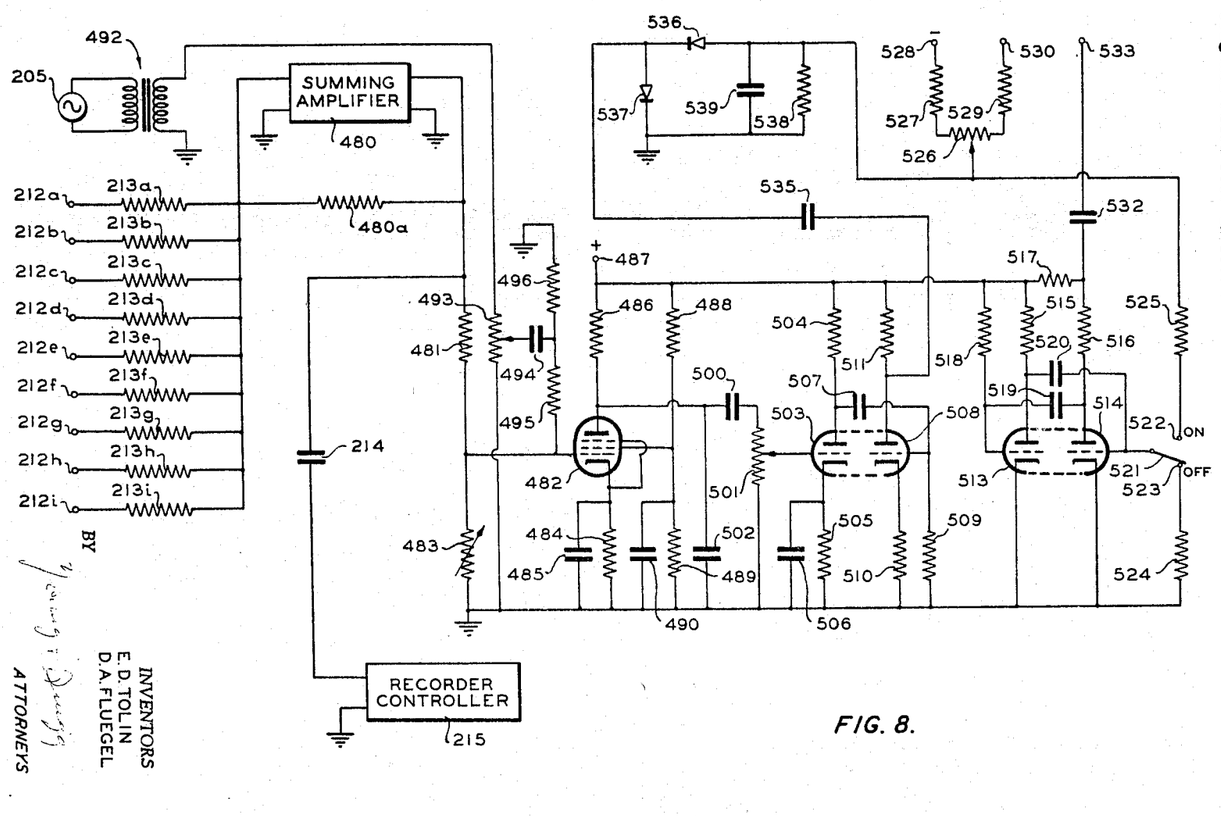
FIGURE 8 is a schematic circuit drawing of the summing and calibration network employed in the computer.

The output signals of the plurality of multiplying circuits of the form of FIGURE 7 are applied to terminals 212a, 212b . . . 212i of FIGURE 8. These terminals are connected through respective resistors 213a, 213b, . . . 213i to the first input terminal of a summing amplifier 480. The first output terminal of amplifier 480 is connected through a capacitor 214 to the first input terminal of a recorder-controller 215. The second input terminal of controller 215 is connected to ground. The signal applied to controller 215 represents the amount of heat liberated by the polymerization reaction. This is obtained from the addition of the heat transfer equations, plus or minus depending upon whether heat is added or substracted. This signal is applied through a conventional control medium to regulate either valve 50 or valve 51. If the indicated heat of reaction should increase, the rate of addition of olefin or catalyst to the reactor is decreased. If the indicated heat of reaction should decrease, the flow of olefin or catalyst is increased. It is thus possible to maintain the reaction at a steady rate which results in the production of polymer of uniform quality. This control operation is described in greater detail hereinafter.

Figure 6:
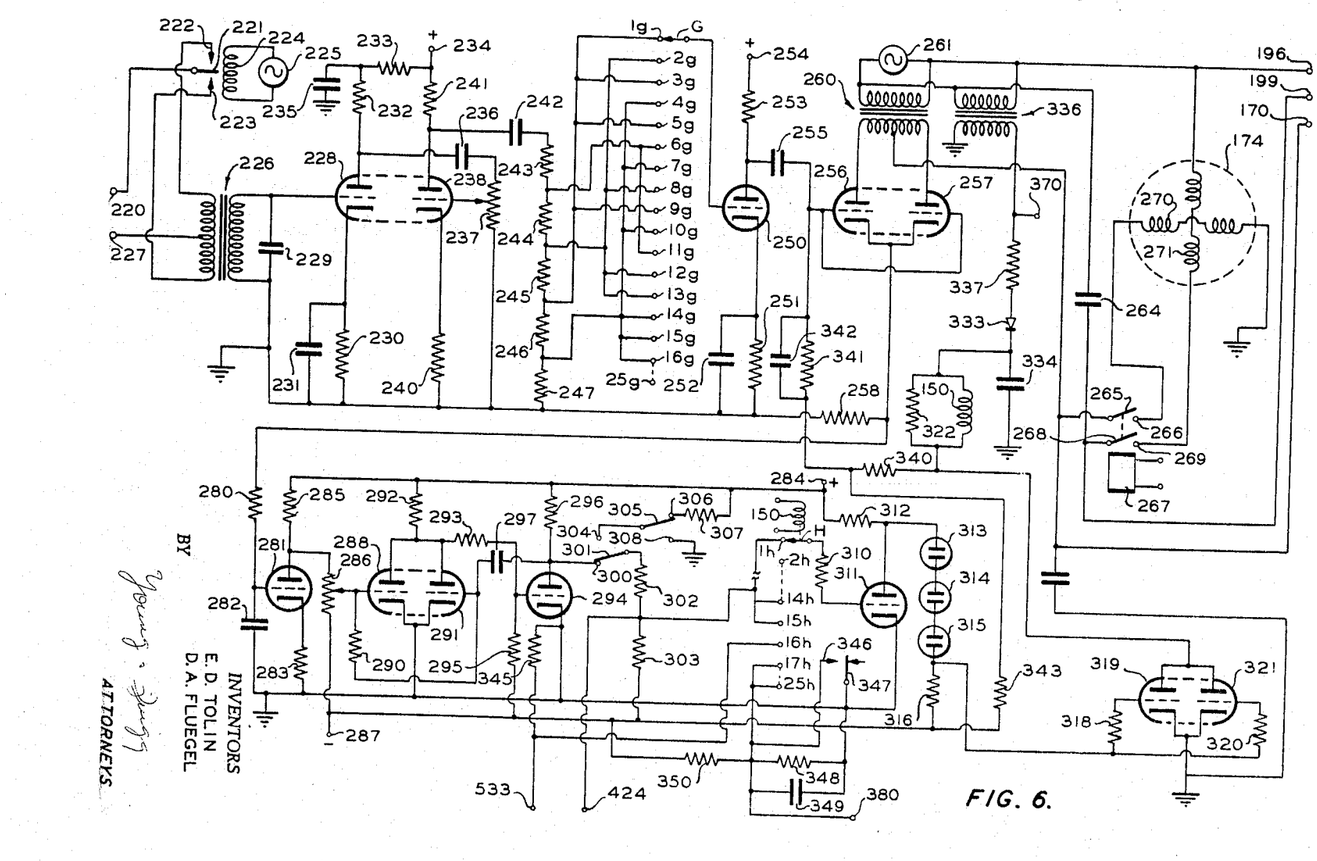
FIGURE 6 is a schematic circuit drawing of a portion of the computer timing mechanism.

Servo amplifier 168 is illustrated in FIGURE 6. The first input terminal 220 (connected to switch 165 of FIGURE 4) is connected to a switch 221 which vibrates between contacts 222 and 223 when a coil 224 is energized by a source of alternating current 225. Contacts 222 and 223 are connected to the respective end terminals of the primary winding of a transformer 226. The second input terminal 227 (connected to switch C of FIGURE 4) of amplifier 168 is connected to the center tap of the primary winding of transformer 226. The first end terminal of the secondary winding of transformer 226 is connected to the control grid of a triode 228. The second end terminal of the secondary winding of transformer 226 is connected to ground. A capacitor 229 is connected in parallel with the secondary winding of transformer 226. The cathode of triode 228 is connected to ground through a resistor 230 which is shunted by capacitor 231. The anode of triode 228 is connected through resistors 232 and 233 to a terminal 234 which is maintained at a positive potential. A capacitor 235 is connected between ground and the junction between resistors 232 and 233. The anode of triode 228 is also connected through a capacitor 236 to the first end terminal of potentiometer 237. The second end terminal of potentiometer 237 is connected to ground. The contactor of potentiometer 237 is connected to the control grid of a triode 238. The cathode of triode 238 is connected to ground through a resistor 240. The anode of triode 238 is connected to terminal 234 through a resistor 241. The anode of triode 238 is also connected to ground through a capacitor 242 and resistors 243, 244, 245, 246 and 247 which are connected in series relationship.

The circuit thus far described in FIGURE 6 converts a direct current input signal into an alternating signal which is amplified. The voltage dividing network formed by resistors 243, 244, 245, 246 and 247 permits output signals of different amplitudes to be applied to the individual servo motors. This compansates for input signals of different amplitudes. In one particular computer which has been constructed, the output circuit from the voltage dividing network was of the configuration illustrated in FIGURE 6. The output terminals 1g, 2g . . . 16g of the stepping switch are connected to the indicated points on the voltage dividing network.

Switch arm G is connected to the control grid of triode 250. The cathode of triode 250 is connected to ground through a resistor 251 which is shunted by a capacitor 252. The anode of triode 250 is connected through a resistor 253 to a terminal 254 which is maintained at a positive potential. The anode of triode 250 is also connected through a capacitor 255 to the control grids of triodes 256 and 257. The cathodes of these triodes are connected to ground through a common resistor 258. The anodes of triodes 256 and 257 are connected to the respective end terminals of the secondary winding of a transformer 260. A source of alternating current 261 is directed across the primary winding of transformer 260. The center tap of the secondary winding of transformer 260 is connected to terminal 170. One terminal of current source 261 is connected to terminal 196, and the second terminal of current source 261 is connected through a capacitor 264 to terminal 199. Terminals 170, 196 and 199 energize servo motor 194 of FIGURE 5. The center tap of the secondary winding of transformer 260 is connected to a switch 265 which engages a terminal 266 when a relay 267 is energized. Terminal 199 is connected to a switch 268 which engages a terminal 269 when relay 267 is energized. Terminal 266 is connected through the first winding 270 of two-phase induction motor 174 to ground. Terminal 269 is connected through the second winding 271 of motor 174 to the first terminal of current source 261.

The output signal of the motor drive amplifier of FIGURE 6 thus energizes one of the servo motors 194 of FIGURE 5 when a relay 192 of FIGURE 5 is energized. The standardization motor 174 is actuated when relay 267 is energized. A single servo amplifier thus energizes a plurality of motors in sequence to perform the balancing operations and standardizing functions.

The stepping switch employed to establish the variables in sequence is actuated by the circuit illustrated in the lower portion of FIGURE 6. The cathodes of triodes 256 and 257 are connected through a resistor 280 to the control grid of a triode 281. A capacitor 282 is connected between the control grid of triode 281 and ground. The cathode of triode 281 is connected to ground through a resistor 283, and the anode of triode 281 is connected to a positive potential terminal 284 through a resistor 285. The anode of triode 281 is also connected to the first end terminal of a potentiometer 286, the second end terminal of potentiometer 286 being connected to a negative potential terminal 287.

The contactor of potentiometer 286 is connected directly to the control grid of a triode 288 and through a resistor 290 to the control grid of a triode 291. The cathodes of triodes 288 and 291 are connected to ground. The anodes of these triodes are connected to terminal 284 through a resistor 292. The anodes of triodes 288 and 291 are also connected through a resistor 293 to the control grid of a triode 294. The control grid of triode 294 is connected through a resistor 295 to negative potential terminal 287. The cathode of triode 294 is connected directly to ground, and the anode of triode 294 is connected through a resistor 296 to positive potential terminal 284. The anode of triode 294 is also connected through a capacitor 297 to the control grid of triode 291.

The anode of triode 294 is connected to a terminal 300 which normally is engaged by a switch 301. Switch 301 is connected through series connected resistors 302 and 303 to negative potential terminal 287. The junction between these resistors is connected to terminals 1h, 2h . . . 15h. These terminals are engaged by switch arm H of the stepping switch. Switch 301 is also adapted to engage a terminal 304 which is connected to a switch 305. Switch 305 normally engages a terminal 306 which is connected through a resistor 307 to positive potential terminal 284. Switch 305 can also engage a terminal 308 which is connected to ground. Switch arm H is connected through a resistor 310 to the control grid of the triode 311. The cathode of triode 311 is connected to ground, and the anode of triode 311 is connected through a resistor 312 to positive potential terminal 284. The anode of triode 311 is connected through neon lamps 313, 314 and 315 and a resistor 316 to negative potential terminal 287. The junction between lamp 315 and resistor 316 is connected through a resistor 318 to the control grid of a triode 319 and through a resistor 320 to the control grid of a triode 321. The cathodes of triodes 319 and 321 are connected to ground. The anodes of triodes 319 and 321 are connected to the first terminals of a resistor 322 and solenoid 150. The second terminals of resistor 322 and solenoid 150 are connected to the junction between a rectifier 333 and a capacitor 334. Current source 261 is connected across the primary winding of a transformer 336. The first end terminal of the secondary winding of transformer 336 is connected through a resistor 337 to rectifier 333. The second terminal of the secondary winding of transformer 336 and the second terminal of capacitor 334 are connected to ground. A positive potential thus appears at the junction between rectifier 333 and capacitor 334.

The anodes of triodes 319 and 321 are connected through series connected resistors 340 and 341 to the control grids of triodes 256 and 257. A capacitor 342 is connected in parallel with resistor 341. The junction between resistors 340 and 341 is connected through a resistor 343 to negative potential terminal 287.

Terminal 16h of the stepping switch is connected through a resistor 345 to the grounded cathode of triode 294. Terminals 17h to 25h are connected to a first interrupter contact 346 of the stepping switch. The interrupter switch 347 is connected through a resistor 348 to terminals 17h to 25h. A capacitor 349 is connected in parallel with resistor 348. A resistor 350 is connected between terminals 17h to 25h and negative potential terminal 287.

In order to describe the switching operation, it is assumed that the input signal from one of the transducers is different from the signal last applied from this particular transducer. This results in the potentiometer circuit being unbalanced so that the servo motor is energized to restore a balanced condition. At this time there is a relatively small direct current through triodes 256 and 257. The cathodes of these two triodes are thus maintained at a relatively small positive potential. This potential is inverted by triode 281 so that a potential is applied to the control grid of triode 288 which permits this triode to conduct. Conduction by triode 288 results in the potential applied to the control grid of triode 294 being sufficiently small to extinguish conduction by triode 294. This effectively applies a positive pulse to the control grid of triode 291 which causes it to conduct. Triodes 288 and 291 thus operate essentially in parallel. The potential at the anode of triode 294 is applied through the stepping switch to the control grid of triode 311. The decreased potential at the anode of triode 311 is in turn applied to the control grids of triodes 319 and 321 to keep these two triodes from conducting.

When the bridge circuit becomes balanced, the direct current through triodes 256 and 257 increases substantially to increase the potential applied to the control grid of triode 281. This results in the potential at the control grid of triode 288 being decreased sufficiently to extinguish conduction by this triode. However, triode 291 continues to conduct until the original charge on capacitor 297 leaks off. This incorporates a delay, which can be of the order of one second, for example. At the end of this period, conduction through triode 291 is extinguished so that the potential at the control grid of triode 294 is increased. The resulting conduction by triode 294 results in the potentials at the control grids of triodes 319 and 321 being increased to cause conduction through these triodes. This energizes solenoid 150 to cock the stepping switch. The resulting negative pulse at the anodes of triodes 319 and 321 is applied to the control grids of triodes 256 and 257. This negative pulse reduces the potential of the two cathodes to restore the condition initially described. This initial condition results in conduction through triodes 319 to 321 being extinguished to enable the arms of the stepping switch to move to the next contacts.

The purpose of the delay in the multivibrator formed by triodes 288 and 291 is to delay cocking of the stepping switch for a given time after the null signal level is reached at the cathodes of triodes 256 to 257. This insures that the potentiometer circuit reaches a final balanced condition before the next variable is engaged by the stepping switch. The pulse fed back to the servo amplifier from triodes 319 and 321 assures release of the stepping switch solenoid once it has been cocked. The interrupter switch 347 moves the stepping switch rapidly from contacts 17h to 25h and back to 1h. At position 16h, the control grid of triode 311 is connected to ground through resistors 310 and 345.

The several servo motors 194, as shown in FIGURE 5, are energized in sequence by the associated relay 192 being energized. These relays are actuated by triodes 360a, 360b . . . 360n of FIGURE 9. The cathodes of each of these triodes are connected to ground. The anode of triode 360a, for example, is connected to a terminal 361a which is connected to the first terminal of relay 192 of FIGURE 5, the second terminal of the relay being connected to a positive potential terminal 377. The anodes of the remaining triodes are likewise connected to a relay which energizes a respective one of the servo motors. The grids of triodes 360a, 360b . . . 360n are connected to respective terminals 2i, 3i . . . 15i of the stepping switch. The control grids of triodes 360a, 360b . . . 360n are also connected through respective resistors 362a, 362b . . . 362n to the junction between resistors 364 and 365. A spare triode 360o also is provided. The second terminal of resistor 364 is connected to a negative potential 366, and a second terminal of resistor 365 is connected to ground. A capacitor 367 is connected in parallel with resistor 365.

Figure 9:
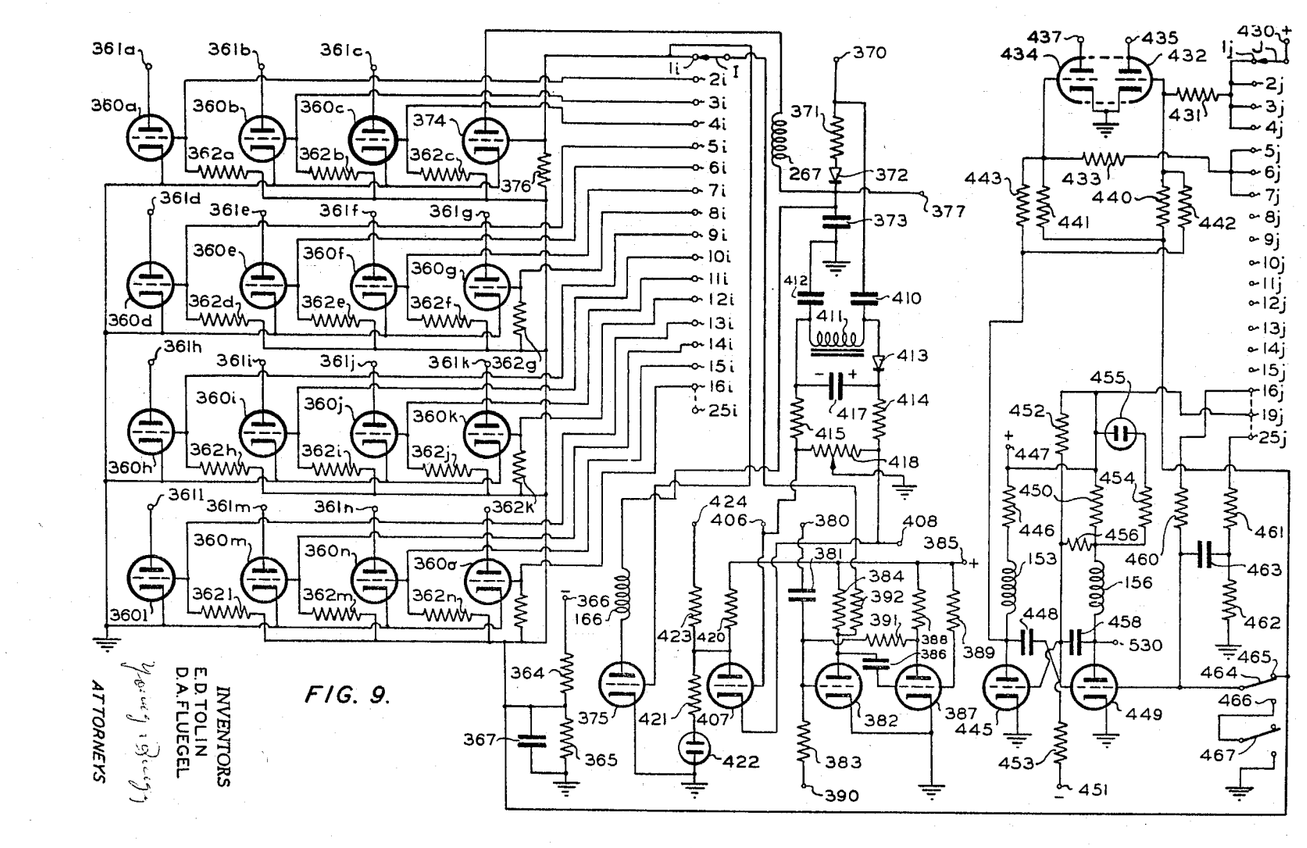
FIGURE 9 is a schematic circuit drawing of a second portion of the timing mechanism.

A terminal 370 is connected to the secondary winding of transformer 336 of FIGURE 6. Terminal 370 is connected through a resistor 371, a rectifier 372, and a capacitor 373 to ground. The anode of a triode 374 is connected through relay coil 267 to the junction between rectifier 372 and capacitor 373. The cathode of triode 374 is connected to ground. The control grid of triode 374 is connected to terminal 1i of the stepping switch and to the control grid of a triode 375. The control grid of triode 374 is also connected to the junction between resistors 364 and 365 through a resistor 376. The anode of triode 375 is connected through relay coil 166 to the junction between rectifier 372 and capacitor 373. The cathode of triode 375 is connected to ground. Terminal 377 is connected between rectifier 372 and capacitor 373.

The potentiometer circuit of the computer is standardized when switch arm I engages terminal 1i. At this time triode 374 conducts so as to energize relay 267, see FIGURE 6. This connects the output signal from the amplifier of FIGURE 6 to standardizing motor 174. Motor 174 then adjusts resistor 180 of FIGURE 4 until there is a zero signal applied to the input of amplifier 168. Relay 166 is also energized at this time so that a voltage from standard cell 184 is applied to the input of amplifier 168. This operation standardizes the potentiometer circuit of FIGURE 4.

Each time the arms of the stepping switch move to the next contacts, interrupter switch 347 of FIGURE 6 momentarily engages contact 346. This applies a positive pulse from terminal 380 of FIGURE 6 through a capacitor 381 to the control grid of a triode 382 of FIGURE 9. The cathode of triode 382 is connected to ground. The control grid of triode 382 is connected to a negative potential terminal 390 through a resistor 383. The anode of triode 382 is connected through a resistor 384 to a positive potential terminal 385. The anode of triode 382 is also connected through a capacitor 386 to the control grid of a triode 387. The cathode of triode 387 is connected to ground. The anode and control grid of triode 387 are connected to terminal 385 through respective resistors 388 and 389. The anode of triode 387 is also connected through a resistor 391 to the control grid of triode 382. The anode of triode 382 is connected through a resistor 392 to switch arm I.

This circuit provides a pulse which maintains the motor relay triodes 360 nonconductive for a predetermined time during and after movement of the switch arms of the stepping switch. The positive pulse from the interrupter switch 347 causes triode 382 to conduct and thereby extinguish conduction through triode 387. Triode 382 continues to conduct until sufficient charge leaks off capacitor 386 to render triode 382 nonconductive once again. The resulting increased potential at the end of triode 382 is applied through switch arm I to cause the associated triode 360 to conduct. This delay prevents power from being applied to the servo motors until switching transients in the potentiometer circuits and amplifier 168 have died out.

The computing circuit is also provided with apparatus for checking periodically the operation of the transducers and of the computer itself. With reference to FIGURE 4, there is shown a plurality of potentiometers 400a, 400b . . . 400l which are adapted to provide preset voltages. The first terminals of all these potentiometers except 400c are connected to a negative potential terminal 401. The first terminal of potentiometer 400c is connected to a terminal 402 which is connected to the cathode of triode 118 through a resistor 402', see FIGURE 3. The second terminals of all these potentiometers are connected to ground. The contactors of these potentiometers are connected to the indicated k terminals of the stepping switch. Switch arm K is connected to a terminal 403. Switch 152 of FIGURE 4 is connected to a terminal 406 which is connected to the control grid of a triode 407 in FIGURE 9. Switch 159 of FIGURE 4 is connected to a terminal 408 which is connected to the cathode of triode 407 of FIGURE 9. Terminal 370 of FIGURE 9 is connected through a capacitor 410, an inductor 411 and a capacitor 412 to ground. The junction between capacitor 410 and inductor 411 is connected through a rectifier 413 and a resistor 414 to terminal 408. The junction between capacitor 412 and inductor 411 is connected through a resistor 415 to terminal 406. The junction between capacitor 412 and inductor 411 is connected through a capacitor 417 to the junction between rectifier 413 and resistor 414. A potentiometer 418, having a grounded contactor, is connected between terminals 406 and 408. The anode of triode 407 is connected through a resistor 420 to terminal 385. The anode of triode 407 is also connected through resistor 421 and a neon lamp 422 to ground. The anode of triode 407 is connected through a resistor 423 to a terminal 424 which is connected through a resistor 423 to a terminal 424 which is connected to the junction between resistors 302 and 303 of FIGURE 6.

During one portion of the checking cycle, relay 153 is deenergized so that the signals between the a and b contacts of the stepping switch are applied between the control grid and cathode of triode 407, FIGURE 9. This triode normally conducts. However, if an open circuit should occur in the transducing elements, conduction by triode 407 is extinguished which increases the potential at the anode thereof. This increase in potential causes neon lamp 422 to conduct so as to provide a warning signal. The resulting positive pulse is also applied through terminal 424 to the h contacts of the stepping switch, FIGURE 6, to prevent the stepping switch from moving further.

The circuit which operates relays 153 and 156 of FIGURE 4 and relays 64 and 72 of FIGURE 3 is illustrated in FIGURE 9. Switch arm J of the stepping switch is connected to a source of positive potential 430. Terminals 1j, 2j, 3j, and 4j are connected through a resistor 431 to the control grid of a triode 432. Terminals 5j, 6j and 7j are connected through a resistor 433 to the control grid of a triode 434. The cathodes of triodes 432 and 434 are connected to ground. The anode of triode 432 is connected by a terminal 435 through relay 72 of FIGURE 3 to a positive potential terminal 436. The anode of triode 434 is connected by a terminal 437 through relay 64 of FIGURE 3 to a positive potential terminal 438. The grids of triodes 432 and 434 are connected through respective resistors 440 and 441 to the junction between resistors 364 and 365. The control grids of triodes 432 and 434 are also connected through respective resistors 442 and 443 to the anode of a triode 445. The anode of triode 445 is connected through relay 153 of FIGURE 4 and a resistor 446 to a positive potential terminal 447. The anode of triode 445 is also connected through a capacitor 448 to the control grid of a triode 449. The cathodes of triodes 445 and 449 are connected to ground. The anode of triode 449 is connected through relay 156 and a resistor 450 to terminal 447 and to terminal 19j. Terminal 19j is also connected to a negative potential terminal 451 through resistors 452 and 453. A resistor 454 and a neon lamp 455 are connected in series relationship with one another and in parallel with resistors 450. A resistor 456 is connected between the junction between resistors 452 and 453 and the junction between resistor 450 and a relay 156. The anode of triode 449 is also connected through a capacitor 458 to the control grid of triode 445.

Terminal 16j is connected through a resistor 460 to the control grid of triode 449. Terminal 25j is connected to ground through resistors 461 and 462. A capacitor 463 is connected between the control grid of triode 449 and the junction between resistors 461 and 462. The control grid of triode 449 is also connected to a switch 464. Switch 464 is adapted to engage a terminal 465 which is connected to the junction between resistors 364 and 365 or a terminal 466 which is connected to a switch 467. Switch 467 is connected to ground when closed.

Triodes 445 and 449 form a nonstable multivibrator. Each time switch arm J engages terminal 16j current flows through resistor 460 to charge capacitor 448. Resistor 460 is extremely large so that capacitor 448 charges quite slowly. Capacitor 448 is charged to some extent each time switch arm J moves past terminal 16j. The charge on capacitor 448 thus increases stepwise. Triode 445 of the multivibrator normally conducts. This situation continues until the charge on capacitor 448 increases sufficiently to cause triode 449 to conduct, which occurs after a relatively large number of cycles of the stepping switch. Conduction by triode 449 extinguishes conduction by triode 445. This energizes relay 156 and deenergizes relay 153. Under this condition, the standard voltages from the potentiometers of FIGURE 4 are connected in the circuit in place of the voltages from the transducers of FIGURE 1. The output signal of the computer at this time should have a predetermined value in view of the standard input signals. Pulses generated at position 25j are coupled through capacitor 463 to the grid of triode 449 to insure that the multivibrator flips at position 25j only and not during normal scanning of the variables (positions 2 through 15).

This overall operation of the computer is checked by means of the circuit shown in FIGURE 8. The second terminals of resistors 213a, 213b . . . 213i are connected to the first input terminal of a summing amplifier 480 which is provided with a feedback resistor 480a. The first output terminal of amplifier 480 is connected through a resistor 481 to the control grid of a pentode 482. The second input and output terminals of amplifier 480 are connected to ground. The control grid of pentode 482 is connected to ground through a variable resistor 483. The cathode and suppressor grid of pentode 482 are connected to ground through a resistor 484 which is shunted by a capacitor 485. The anode of pentode 482 is connected through a resistor 486 to a terminal 487 which is maintained at a positive potential. The screen grid of pentode 482 is connected to terminal 487 through a resistor 488 and to ground through a resistor 489 which is shunted by a capacitor 490.

Alternating current source 205 is connected across the primary winding of a transformer 492. The first end terminal of the secondary winding of transformer 492 is connected to ground through a potentiometer 493. The second end terminal of the secondary winding of transformer 492 is connected to ground. The contactor of potentiometer 493 is connected through a capacitor 494 and a resistor 495 to the control grid of pentode 482. The junction between capacitor 494 and resistor 495 is connected to ground through a resistor 496.

The anode of pentode 482 is connected through a capacitor 500 to the first end terminal of a potentiometer 501. The second end terminal of potentiometer 501 is connected to ground. A capacitor 502 is connected between the anode of pentode 482 and ground. The contactor of potentiometer 501 is connected to the control grid of a triode 503. The anode of triode 503 is connected to terminal 487 through a resistor 504, and the cathode of triode 503 is connected to ground through a resistor 505 which is shunted by a capacitor 506. The anode of triode 503 is connected through a capacitor 507 to the control grid of a triode 508. The control grid of triode 508 is connected to ground through a resistor 509. The cathode of triode 508 is connected to ground through a resistor 510, and the anode of triode 508 is connected to terminal 487 through a resistor 511.

The sum of the voltages from the several multiplying units of FIGURE 7 is thus applied to the control grid of pentode 482. A reference signal which is 180° out of phase with this summed signal is also applied to the control grid of pentode 482 from current source 205. The magnitude of the difference between the output and reference signals at junction of 481, 495 and 483 can be varied by adjustable resistor 483 to determine the magnitude of the permissible error. If the overall computer network is operating properly with the reference voltages being applied to the input terminals, the output signal from pentode 482 is zero. However, if an error has occurred any place in the computer network, the two voltages being compared are no longer equal so that an output signal is provided by pentode 482. The amplifier circuit formed by triodes 503 and 508 is biased so that the output signal from triode 508 never exceeds a predetermined value, that is, the amplifier output is clipped.

The circuit shown in the remainder of FIGURE 8 forms a multivibrator which normally provides output pulses at a predetermined frequency during operation of the computer. The cathodes of triodes 513 and 514 are connected to ground. The anode of triode 513 is connected to terminal 487 through a resistor 515, and the anode of triode 514 is connected to terminal 487 through resistors 516 and 517. The control grid of triode 513 is connected to terminal 487 through a resistor 518. A capacitor 519 is connected between the anode of triode 514 and the control grid of triode 513. A capacitor 520 is connected between the anode of triode 513 and the control grid of triode 514. The control grid of triode 514 is connected to a switch 521 which is adapted to engage terminals 522 and 523. Terminal 523 is connected to ground through a resistor 524. The checking circuit of FIGURE 8 is turned off when switch 521 engages terminal 523. Terminal 522 is connected through a resistor 525 to the contactor of potentiometer 526. The first end terminal of potentiometer 526 is connected through a resistor 527 to a negative potential terminal 528. The second end terminal of potentiometer 526 is connected through a resistor 529 to a terminal 530 which is connected to the anode of triode 449 of FIGURE 9.

During normal operation of the computer, the bias applied to the control grid of triode 514 from potentiometer 526 is such that the multivibrator formed by triodes 513 and 514 provides an output pulse at predetermined intervals, which can be of the order of one-half second, for example. The junction between resistors 516 and 517 is connected through a capacitor 532 to a terminal 533 which is connected to terminal 16h of FIGURE 6. The resulting pulses move the stepping switch past the 16th contacts. The anode of triode 508 is connected through a capacitor 535 to the positive terminal of a rectifier 536 and to the negative of a rectifier 537. The positive terminal of rectifier 537 is connected to ground. The negative terminal of rectifier 536 is connected to ground through a resistor 538 which is shunted by a capacitor 539. An output signal from triode 508 thus results in a negative signal appearing at the control grid of triode 514. When triode 449 of FIGURE 9 is conducting, this signal from triode 508 extinguishes conduction through triode 514 so that the pulses applied to terminal 16h of FIGURE 6 are discontinued. This operates to stop further movement of the stepping switch. The circuit of FIGURE 3 is checked when relays 64 and 72 of FIGURE 3 are both energized. This connects the input of amplifier 75 to the contactor of a potentiometer 250'. One end terminal of potentiometer 250' is connected to ground. The second end terminal of potentiometer 250' is connected through a variable resistor 251' and a resistor 252' to the first end terminal of the secondary winding of transformer 86. A capacitor 253' is connected in parallel with resistor 252'. A reference check voltage is thus applied from source 85 to the input of amplifier 75.

It should be evident from the foregoing description that many of the terminals shown are merely for the purpose of designating connections between the several figures. Also, many of the switches are for the purpose of turning off portions of the apparatus or to permit manual operation for test purposes.

The circuit illustrated normally provides an automatic computation of the heat liberated by the polymerization reaction. The sources of heat removal from the reactor are indicated as signals of a first polarity whereas the sources of heat addition are indicated as signals of a second polarity. The sum provided by the circuit of FIGURE 8 thus represents the net heat of reaction. This final signal is an alternating voltage. Controller 215 converts this signal into an output control signal, such as a pneumatic pressure which regulates valve 50 or valve 51 of FIGURE 1. This can be accomplished by a transducer of the type described in Bulletin A-710, the Swartwout Company, Cleveland, Ohio. In one specific embodiment of the control system, valve 50 can be represented by a variable stroke piston pump to pass the catalyst slurry. The control signal can adjust the stroke or speed of the pump. A conventional control valve can also be employed for this purpose. This invention thus provides an efficient procedure for regulating polymerization in response to a measurement of the heat liberated by the reaction. It should be evident that in some polymerization systems, certain of the variables measured in the example normally are sufficiently constant as to be omitted. The control system can thus be simplified in these applications.

Figure 10:
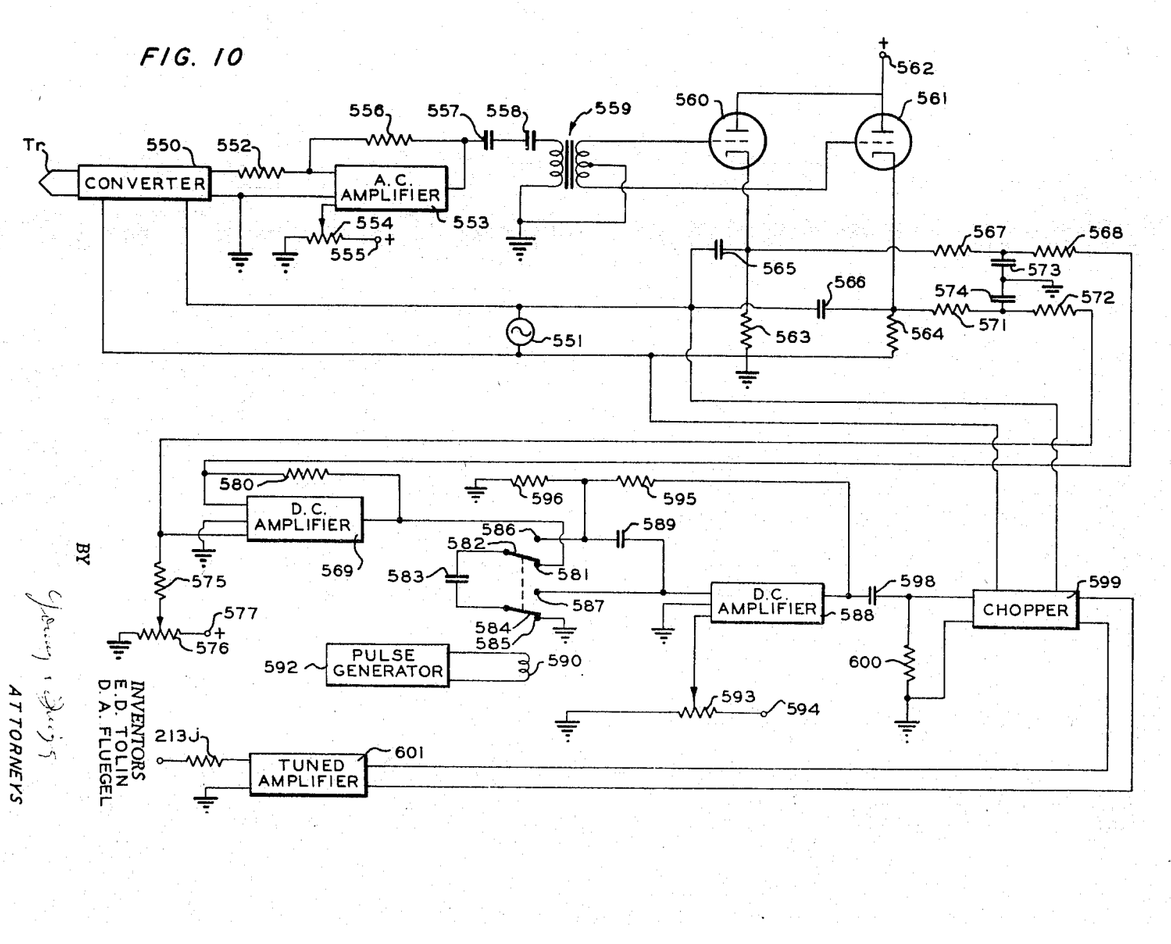
FIGURE 10 is a schematic circuit drawing of the reactor temperature compensating network of this invention.

In the computer thus far described it has been assumed that the temperature of reactor 30 does not fluctuate rapidly, for example, not more than about 0.1° F. per minute. However, it has been found in practice that the reactor temperature sometimes changes at a faster rate. The circuit illustrated in FIGURE 10 is provided to compensate for such changes in reactor temperature. A thermocouple $T_R$ is employed to measure the temperature of reactor 30. The output signal of this thermocouple is applied to a converter 550 which is energized from a source of alternating current 551 to provide an output alternating signal. The first output terminal of converter 550 is connected through a resistor 552 to the first input terminal of an alternating current amplifier 553. The second output terminal of converter 550 is connected to ground. The second input terminal of amplifier 553 is connected to the contactor of a potentiometer 554. The first end terminal of potentiometer 554 is connected to a positive potential terminal 555, and the second end terminal of potentiometer 554 is connected to ground. A feed-back resistor 556 is connected between the output terminal of amplifier 553 and the first input terminal. The output terminal of amplifier 553 is connected through capacitors 557 and 558 to the first terminal of a primary winding of a transformer 559, the second terminal of which is connected to ground.

Amplifier 553 preferably is of the form illustrated in FIGURE 3. This amplifier is represented by the triodes 104, 106, 111 and 118 of FIGURE 3. The first input terminal of amplifier 553 is the control grid of triode 104, and the second input terminal is the control grid of triode 106. The cathode of triode 118 forms the output terminal of the linear amplifier. Resistors 552 and 556 are selected so that the output signal of amplifier 553 is a linear function of the input signal.

The end terminal of the secondary winding of transformer 559 is connected to the control grid of respective triodes 560 and 561. The center tap of the secondary winding of transformer 559 is connected to ground. The anodes of triodes 560 and 561 are connected to a positive potential terminal 562, and the cathodes of triodes 560 and 561 are connected to ground through respective resistors 563 and 564. The first terminal of current source 551 is connected to the cathodes of triodes 560 and 561 through respective capacitors 565 and 566. The cathode of triode 560 is connected through resistors 567 and 568 to the first input terminal of a direct current amplifier 569. The cathode of triode 561 is connected through resistors 561 and 572 to the second input terminal of amplifier 569. A capacitor 573 is connected between ground and the junction between resistors 567 and 568, and a capacitor 574 is connected between ground and the junction between resistors 571 and 572.

Triodes 560 and 561 and the circuit elements connected thereto form a phase detector so that a direct voltage is applied to the input of amplifier 569 which is proportional to the alternating output signal from amplifier 553. The second input terminal of amplifier 569 is connected through a resistor 575 to the contactor of a potentiometer 576. One end terminal of potentiometer 576 is connected to a positive potential terminal 577, and the second end terminal of potentiometer 576 is connected to ground. A feed-back resistor 580 is connected between the output terminal of amplifier 569 of the first input terminal. Amplifier 569 can be of the same configuration as amplifier 553 except that the output is linear.

The output terminal of amplifier 569 is connected to a terminal 581 which is adapted to be engaged by a first switch 582. A capacitor 583 is connected between switch 582 and a switch 584 which engages a grounded terminal 585 when switch 582 engage terminal 581. Switches 582 and 584 are also adapted to engage respective terminals 586 and 587. Terminal 587 is connected to the first input terminal of a direct current amplifier 588, and terminal 586 is connected to the first input terminal of amplifier 588 through a capacitor 589. Switches 582 and 584 are actuated in unison by a solenoid 590 which is energized at a predetermined frequency by the output signal from a low frequency pulse generator 592, for example, one-tenth cycle per second. The second input terminal of amplifier 588 is connected to the contactor of a potentiometer 593. The first end terminal of potentiometer 593 is connected to a positive potential terminal 594, and the second end terminal of potentiometer 593 is connected to ground. A feed-back resistor 595 is connected between the output terminal of 588 and terminal 586. A resistor 596 is connected between this terminal and ground.

The output signal from amplifier 569 is applied to a storage and comparison circuit which compares levels at equal time intervals and takes the derivative of the reactor temperature. This signal charges capacitor 583 when switches 582 and 584 are in the positions illustrated. When the switches move into engagement with respective terminals 586 and 587, the signal originally stored on capacitor 583 is applied to amplifier 588 through capacitor 589. Pulse generator 592 provides signals at a low frequency so that the output signals from amplifier 569 are compared successively with the original signal. If the reactor temperature has a derivative, the output of amplifier 588 represents this derivative superimposed on a D.C. level.

The output terminal of amplifier 588, which can be of the form of amplifier 553, is applied through a capacitor 598 to the first input terminal of a chopper 599. The first input terminal of chopper 599 is connected to ground through a resistor 600. The second input terminal of chopper 599 is connected to ground. Chopper 599 is energized by current source 551 to provide an output signal of the frequency of source 551. This signal is applied to the input of an amplifier 601 which is tuned to pass only signals of the frequency of current source 551. The first output terminal of amplifier 601 is connected through a resistor 213j to the input of summing amplifier 480 of FIGURE 8. The second output terminal of amplifier 601 is connected to ground.

Capacitor 598 and resistor 600 form a filter circuit which passes the derivative of the reactor temperature which is at a frequency determined by the pulse generator and which blocks the D.C. level. This passed signal is converted into a corresponding alternating signal, amplified and applied to the summing network of FIGURE 8 so as to compensate for any temperature changes within reactor 30. It should be evident that the circuit of FIGURE 10 is not required if the rate of change of the temperature of reactor 10 is relatively small.

While the invention has been described in conjunction with a present preferred embodiment, it obviously is not limited thereto.

What is claimed is:

1. In a polymerization process wherein the material to be polymerized and a catalyst are directed to a polymerization zone and the resulting products are removed from the zone, a control system comprising means to measure the heat supplied to said zone, means to measure the heat removed from said zone, means to measure the difference between the heat supplied and the heat removed, means responsive to said means to measure the difference to control the operation of the process to tend to produce polymer at a uniform rate, means to measure the rate of temperature change of said zone, and means responsive to said means to measure the rate of temperature change to adjust said means to control.

2. The control system of claim 1 wherein said means to measure the rate of temperature change comprises means to establish a first signal representative of the temperature of said zone, means responsive to said first signal to establish a second signal representative of the derivative of said first signal with respect to time, and means to transmit an output signal representative of said second signal at preselected time intervals.

3. The control system of claim 1 wherein said means to measure the rate of temperature change comprises means to establish a first signal representative of the temperature of said zone, a signal storage means, differentiating means to establish an output signal representative of the derivative of an input signal applied thereto, means to connect said first signal to said storage means periodically, and means to connect said storage means to the input of said differentiating means periodically and at such times as said input signal is not being applied to said storage means.

4. In a polymerization process wherein the material to be polymerized and a catalyst are directed to a polymerization zone and the resulting products are removed from the zone, a control system comprising means to measure the rate at which heat is supplied to said zone and to establish a first signal representative thereof, means to measure the rate at which heat is removed from said zone and to establish a second signal representative thereof, means to measure the rate of temperature change in said zone and to establish a third signal representative thereof, means to sum algebraically said first, second and third signal to establish a fourth signal representative of such sum, and means responsive to said fourth signal to control the operation of the process to tend to produce polymer at a uniform rate, as indicated by said fourth signal remaining constant.

5. In a polymerization process wherein the material to be polymerized and a catalyst are directed to a polymerization zone and the resulting products are removed from the zone, a system for establishing a signal which is representative of the rate at which polymer is produced comprising means to measure the rate at which heat is supplied to said zone and to establish a first signal representative thereof, means to measure the rate at which heat is removed from said zone and to establish a second signal representative thereof, means to measure the rate of temperature change in said zone and to establish a third signal representative thereof, and means to sum algebraically said first, second and third signal to establish a fourth signal representative of such sum, said fourth signal being representative of the rate at which polymer is produced.

No references cited.

MALCOLM A. MORRISON, *Primary Examiner.*

K. W. DOBYNS, *Assistant Examiner.*